United States Patent [19]

Boutevin et al.

[11] Patent Number: 4,717,744

[45] Date of Patent: Jan. 5, 1988

[54] FLUORINATED TELOMERS CONTAINING HYDROPHILIC GROUPS, PROCESS FOR PREPARATION THEREOF, AND THE USE THEREOF AS SURFACTANTS IN AQUEOUS MEDIA

[75] Inventors: Bernard Boutevin, Montpellier; Yves Pietrasanta, Meze; Mohamed Taha, Montpellier; Andre Lantz, Vernaison, all of France

[73] Assignee: Atochem, France

[21] Appl. No.: 813,061

[22] Filed: Dec. 24, 1985

[30] Foreign Application Priority Data

Dec. 26, 1984 [FR] France ............................... 84 19834

[51] Int. Cl.$^4$ ........................... A62D 1/04; B01F 17/52
[52] U.S. Cl. ........................................... 524/17; 252/2; 252/3; 252/8.05; 524/26; 526/206; 526/303.1; 526/317.1
[58] Field of Search ................. 252/2, 3, 8.05; 524/17, 524/26; 526/206, 303.1, 317.1

[56] References Cited

U.S. PATENT DOCUMENTS

| | | | |
|---|---|---|---|
| 3,475,333 | 10/1969 | Meldrum et al. ................. | 252/8.05 |
| 4,420,434 | 12/1983 | Falk ................................ | 252/2 |
| 4,424,133 | 1/1984 | Mulligan ........................ | 252/2 |
| 4,430,272 | 2/1984 | Ehrl et al. ...................... | 252/2 |
| 4,563,287 | 1/1986 | Hisamoto et al. .............. | 252/2 |
| 4,606,832 | 8/1986 | Hisamoto et al. .............. | 252/2 |

Primary Examiner—Ronald W. Griffin
Attorney, Agent, or Firm—Brooks Haidt Haffner & Delahunty

[57] ABSTRACT

Fluorinated telomers which can be defined by the formula:

$$R_F-C_mH_{2m}-(CH_2-CR_1R_2)_nX \qquad (I)$$

wherein $R_F$ is a poly- or perfluorinated radical; X is iodine, chlorine or bromine; m is 0, 1 or 2; n is from 5 to 1000; $R_1$ is hydrogen or methyl; and $R_2$ is a —COOH or —CONR$_3$R$_4$ group, R$_3$ and R$_4$ being hydrogen or alkyl or hydroxyalkyl radicals, such telomers being obtained by free radical reaction of an ethylenic monomer $CH_2=CR_1R_2$ with a fluorinated telogen $R_F-C_mH_{2m}-X$, and being excellent surfactants in aqueous media with special usefulness as additives to fire-fighting protein-based emulsifiers.

18 Claims, No Drawings

FLUORINATED TELOMERS CONTAINING HYDROPHILIC GROUPS, PROCESS FOR PREPARATION THEREOF, AND THE USE THEREOF AS SURFACTANTS IN AQUEOUS MEDIA

BACKGROUND OF THE INVENTION

The present invention relates to novel fluorinated compositions, and more specifically, it relates to double-sequence compounds having a completely or partially fluorinated sequence and a hydrophilic hydrocarbon sequence, together with processes for preparing same, and use thereof as surfactants, especially in fire-fighting emulsifiers.

Perfluorinated compounds are well known for their ability to lower considerably the surface tension of liquids in which they are dissolved, even at very low concentrations. However, to be usable as surfactants in an aqueous medium, they must be made water-soluble. To this end, a hydrophilic group or sequence, which can be anionic, cationic, amphoteric or nonionic in nature, is added to the fluorinated chain. Such surfactants are well known. See, for example, R. E. Banks, "Organofluorine Chemicals and Their Industrial Applications", London: Ellis Horwood, Ltd., 1979, pages 214–234.

In the majority of fluorinated surfactants, the hydrophilic portion consists of a conventional chemical group such as a carboxylate, sulfonate, quaternary ammonium, or betaine group, and the like, but fluorinated surfactants are also known in which the hydrophilic portion is a hydrophilic oligomeric arrangement. Thus, in U.S. Pat. No. 2,723,999 there are described products corresponding to the formula:

$C_xF_{2x+1}CH_2O-(C_2H_4O)_yH$ with y being one to 200.

In U.S. Pat. No. 4,377,710, there are described products having the formula:

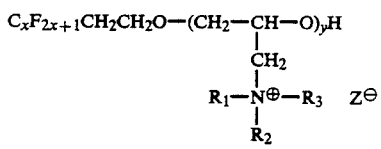

$$C_xF_{2x+1}CH_2CH_2O-(CH_2-\underset{\underset{\underset{R_2}{|}}{\overset{\overset{R_1-N^{\oplus}-R_3}{|}}{CH_2}}}{CH}-O)_yH \quad Z^{\ominus}$$

The main advantage of this type of surfactant comes from the possibility of easily varying their hydrophobic/hydrophilic balance. Moreover, European patent No. 19,584 describes the preparation of products of the type:

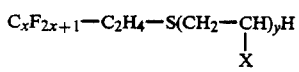

$$C_xF_{2x+1}-C_2H_4-S(CH_2-\underset{\overset{|}{X}}{CH})_yH$$

where y can vary from four to 500 and X is particularly a COOH or CONH$_2$ group, by free-radical telomerization of a thiol $C_xF_{2x+1}C_2H_4SH$ with a vinyl monomer such as, for example, acrylic acid or acrylamide.

The reaction of perfluoroalkyl iodides with olefins

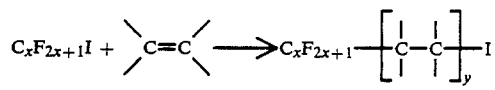

has, moreover, been very extensively studied, in particular by N. O. Brace, U.S. Pat. No. 3,145,222 and J. Org. Chem. 27, 3033 (1962); 27, 4491 (1962); and 32, 430 (1967). However, in the majority of cases, this reaction only provides a monoaddition product with y being one, and only certain highly reactive olefins give oligomers in which y is greater than one. Thus, ethyl acrylate provides a product with y equal to eight, and styrene a derivative with y being two. While the free-radical reaction of perfluoroalkyl iodides with olefins is known, the same does not, on the other hand, apply to the analogous reaction of derivatives of the type $C_xF_{2x+1}-CH_2I$ or $C_xF_{2x+1}-C_2H_4I$.

THE INVENTION

It has now been found that, by reacting fluorinated telogens with certain olefins (for example, acrylamide or acrylic acid), fluorinated telomers can be obtained in which the average degree of telomerization can vary over a wide range.

The present invention accordingly provides novel double-sequence compounds comprising fluorinated telomers which are represented by the general formula:

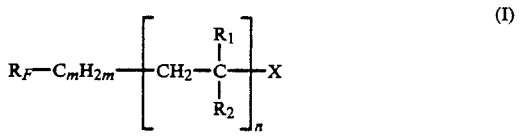

$$R_F-C_mH_{2m}-\left[CH_2-\underset{\underset{R_2}{|}}{\overset{\overset{R_1}{|}}{C}}\right]_n-X \quad (I)$$

and are obtained by free-radical telomerization of a monomer having the formula:

$$H_2C=C\underset{R_2}{\overset{R_1}{\diagdown}} \quad (II)$$

with a fluorinated telogen having the formula:

$$R_F-C_mH_{2m}-X \quad (III)$$

In the formulas (I) to (III), $R_F$ is a linear or branched poly- or perfluorinated radical; X is iodine, bromine or chlorine; m is zero, one or two; n is a number from five to 1000; $R_1$ is hydrogen or methyl; and $R_2$ is a —COOH or —CONR$_3$R$_4$ group, R$_3$ and R$_4$ being the same or different and being hydrogen or an alkyl or hydroxyalkyl group.

More especially, in certain embodiments of the invention, $R_F$ can be a straight or branched perfluoroalkyl radical having the formula:

$C_xF_{2x+1}-$ where x is an integer from one to 20, and in certain preferred embodiments from four to 16.

Preferred fluorinated telogens (III) are those in which X is iodine and m is zero or two.

As monomers of formula (II), acrylamide, methacrylamide, N-isopropylacrylamide, N-(hydroxymethyl)acrylamide, acrylic acid and methacrylic acid are desirably used in certain embodiments of this invention.

The fluorinated telogens of formula (III) are known products. Those of formulas $R_F$—I and $R_F$—$C_2H_4$—I preferably used in this invention are, for example, described by R. N. Haszeldine, J.C.S. 1949, 2856–2861, and J.C.S. 1953, 3761. The derivatives $R_FC_2H_4I$ are generally obtained by the free-radical reaction of $R_FI$ molecules with ethylene:

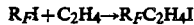

$$R_FI + C_2H_4 \rightarrow R_FC_2H_4I$$

this reaction leading almost exclusively to the monoaddition product $R_FC_2H_4I$, and yielding very little or no higher telomers such as $R_F(C_2H_4)_2I$ or $R_F(C_2H_4)_3I$. For the preparation of telogens $R_FCH_2I$, reference is made to the article by G. V. D. Tiers in J.A.C.S. 75, 5978 (1953) and Phosphorus and Sulfur 20, 197 (1984).

The proportions of monomer (II) and telogen (III) to be employed can vary over a wide range, and depend mainly on the desired number average degree of telomerization, $\overline{DPn}$, that is to say, on the value of n, this degree of telomerization being related on the one hand to the transfer ($C_T$) constant, and on the other hand to the telogen/monomer mole ratio (R) by the equation:

$$1/\overline{DPn} = 1/\overline{DPo} + _T\cdot R$$

$\overline{DPo}$ being the degree of polymerization in the absence of chain transfer. For a given telogen, transfer constant $C_T$ can be determined in a known manner (see Examples I to IX herein), and corresponds to the slope of the curve representing the reciprocal of $\overline{DPn}$ as a function of R ($\overline{DPn}$ values obtained at the beginning of processes carried out while varying the ratio R, and determined by percentage analysis of the fluorine in the purified telomers).

Depending on the telomers which it is desired to obtain, the reaction can be performed batch-wise, semi-continuously or continuously.

To initiate the reaction, a compound which thermally decomposes into two radicals is used. This compound can be, for example, a peroxide such as tert-butyl peroxide and benzoyl peroxide; a hydroperoxide such as cumene hydroperoxide and tertbutyl hydroperoxide; an azo compound such as asobisisobutyronitrile; or a percarboxylate such as tert-butyl perbenzoate, and the like. The reaction can also be initiated by UV (ultraviolet) radiation with or without photoinitiators such as, for example, benzoin ethers, benzophenone, 2-methylanthraquinone, and benzil. The amount of initiator or photoinitiator to be used can be from 0.1 to 5% with respect to the weight of monomer (II). When a fluorinated telogen (III) is used in which m equals zero, the reaction is preferably performed shielded from light.

The reaction can be carried out in an inert solvent or vehicle such as, for example, an alcohol, a nitrile, tetrahydrofuran, a ketone, or dimethylformamide. The reaction is generally carried out at a temperature from 30° to 100° C.

The fluorinated telomers obtained according to the process of the invention are excellent surfactants, especially in aqueous media. In comparison with other known double-sequence fluorinated surfactants in which the hydrophilic portion of the molecule is an oligomeric chain, for example, the products mentioned above, they have the important advantage of being obtained from readily available telogens, for example, $R_FI$ and $R_FC_2H_4I$. The similar products described in the aforementioned patents, U.S. Pat. Nos. 2,723,999; 4,377,710 and European patent No. 19,584, are in effect obtained from products such as $R_FC_2H_4OH$ or $R_FC_2H_4SH$, which are themselves manufactured from $R_FC_2H_4I$ and hence $R_FI$ molecules. The process of this invention permits $R_FI$ and $R_FC_2H_4I$ molecules to be used directly and is accordingly much more advantageous economically.

The new fluorinated telomers according to the invention can be used in many fields, especially in all cases in which it is desirable to lower the surface tension of a liquid or confer both a hydrophobic and oleophobic feature on the substrate. They can be used, for example, as wetting agents, foaming agents, emulsifiers, dispersants, leveling agents for waxes, varnishes, paints and inks, and as lubricant additives.

An especially useful employment of the telomers of the invention is in the preparation of fluoroprotein-based fire-fighting emulsifiers. The use of protein-based emulsifiers in the fire extinguishment area is very widespread. See, for example, "Agents extincteurs", Centre National de Prevention et de Protection("Fire extinguishing agents", National Center for Prevention and Protection), Paris 1982. The protein-based emulsifiers are hydrolyzates of animal or vegetable proteins, the raw materials being, in particular, bovine horn and hoof powders, ground feathers, blood, and the like. The hydrolysis of these protein materials is generally carried out using sodium hydroxide or lime, and these protein-based emulsifiers are extensively used for protection against the high risks of fire encountered in the petroleum industry (refineries, hydrocarbon storage, oil tankers, and the like). Protein-based emulsifiers make it possible to obtain a very tight foam which is exceptionally fireproof and is slow to collapse. The foams obtained from protein-based emulsifiers possess, however, some disadvantages, namely, the foam is very compact and difficult to spread on the fire source, and the resistance of the foam to contamination by hydrocarbons is poor, and this obviates, for example, its use in vigorous spraying.

To improve the efficacy of these protein-based emulsifiers, it is known to incorporate therein very small amounts of fluorinated surfactants. See, for example, U.S. Pat. No. 3,475,333; French patent Nos. 2,007,254 and 2,010,842; and European patent No. 19,584). This doping of the protein-based emulsifiers with fluorinated surfactants makes it possible to obtain a more fluid foam, which is lighter and has better resistance to contamination by hydrocarbons. Most fluorinated surfactants permit the fluidity of the foam, that is to say, its ease of spreading, to be improved, but the other properties of the foam are generally not so good. The foaming power or expansion of the foam (the ratio between the volume of foam produced and the volume of foaming solution which serves to produce this foam) is generally lower, and foam formed is very often much less stable, that is to say, it collapses more quickly to return to the state of foaming solution. Slow collapse is a quality factor, since the foam provides a stable blanket for an extended period. Moreover, most fluorinated surfactants do not permit a substantial improvement to be made in the resistance to contamination by hydrocarbons, which is an essential property of a good emulsifier.

It has been found that the fluorinated surfactants according to this invention, and especially the products obtained by telomerization of acrylamide with $R_FI$ and $R_FC_2H_4I$, permit, by incorporation in a standard protein-based emulsifier, emulsifiers to be obtained having excellent foam properties with respect to foaming power, expansion ratio, settling time, foam fluidity, and resistance to contamination by hydrocarbons, and which are hence especially effective for fire-fighting. The quantity of fluorinated surfactant according to this invention to be incorporated in the protein-based emulsifier is generally such that, after dilution of the emulsifier with water, the dilute solution contains from 0.005 to 0.5% by weight of the fluorinated surfactant, lower or higher amounts of course being usable if so desired.

All parts, percentages, proportions, and ratios herein are by weight unless otherwise stated.

The following Examples are given to illustrate embodiments of the invention as it is presently preferred to practice it. It will be understood that these Examples are illustrative, and the invention is not to be considered as restricted thereto except as indicated in the appended claims.

EXAMPLES I–IX

Telomerization of acrylamide with $C_6F_{13}CH_2CH_2I$ (Determination of the transfer constant)

Nine telomerization reactions are carried out by varying the mole ratio (Ro) of the $C_6F_{13}CH_2CH_2I$ to the acrylamide. The reaction is carried out at 80° C. in solution in butyronitrile (1.5 times the volume of acrylamide) and in the presence of 2% of azobisisobutyronitrile relative to the weight of acrylamide. The reaction is interrupted when the extent of progress, "α", of the reaction, determined by weighing a sample, is very small (2%).

The white precipitate obtained is filtered off, washed several times with acetone, dried in a vacuum oven, and subjected to elementary analysis of the fluorine to calculate the $\overline{DP}n$ by the equation:

$$\% F = \frac{13 \times 18.99 \times 100}{71 \times \overline{DP}\,n + 473.87}$$

The following Table summarizes the results obtained as a function of the mole ratio, Ro.

TABLE I

| EXAMPLE | Ro    | % F  | $\overline{DP}\,n$ |
|---------|-------|------|------|
| I       | 0.075 | 0.40 | 863  |
| II      | 0.25  | 0.58 | 593  |
| III     | 0.50  | 0.68 | 505  |
| IV      | 0.75  | 1.08 | 315  |
| V       | 1     | 1.28 | 265  |
| VI      | 1.5   | 1.75 | 192  |
| VII     | 2     | 2.04 | 163  |
| VIII    | 3     | 2.98 | 110  |
| IX      | 6     | 5.49 | 57   |

By expressing the values $1/\overline{DP}n$ as a function of Ro, a straight line is obtained, the slope of which corresponds to the transfer constant of the telogen $C_6F_{13}CH_2CH_2I$ at 80° C., and it is found that $C_{80} = 28 \times 10^{-4}$.

IR (infrared) analysis of the telomers obtained shows, in addition to the absorption bands characteristic of a poly-acrylamide, a multitude of bands between 1100 and 1400 cm$^{-1}$. These bands are characteristic of perfluorinated products, and their relative intensities increase as the $\overline{DP}n$ decreases.

EXAMPLES X–XVI

The method of Examples I–IX is repeated, except that the reaction is only interrupted after the complete disappearance of the acrylamide (approximately three hours).

The results obtained in seven distinct operations are presented in Table II.

TABLE II

| EXAMPLE | Ro  | % F  | $\overline{DP}\,n$ |
|---------|-----|------|-----|
| X       | 1   | 1.80 | 186 |
| XI      | 1.5 | 1.65 | 204 |
| XII     | 2   | 2.32 | 143 |
| XIII    | 3   | 3.57 | 90  |
| XIV     | 4   | 4.19 | 76  |
| XV      | 6   | 6.04 | 51  |
| XVI     | 8   | 5.65 | 55  |

EXAMPLE XVII

A glass reactor is charged with 50 g of $C_6F_{13}CH_2CH_2I$ and 25 ml of isopropyl alcohol. The mixture is brought to reflux with stirring, and a solution of 50 g of acrylamide, 1.4 g of azobisisobutyronitrile, and 200 ml of isopropyl alcohol is added during eight hours. When the addition is complete, the mixture is maintained under reflux for a further one hour, and then cooled to room temperature.

The reaction mixture is then filtered, and the solid is washed twice with 20 ml of isopropanol, then drained and dried under vacuum. Forty-five grams of a white pulverulent solid is thereby obtained, the fluorine content of which is equal to 2.57%, which corresponds to a $\overline{DP}n$ of 129. This product has the formula:

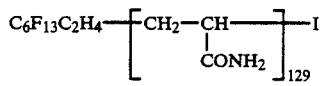

The product is soluble in water and an aqueous solution at 1000 ppm has a surface tension of 28.9 mN/m at 25° C. At 100 ppm, the same product provides a surface tension equal to 44.8 mN/m to be obtained.

EXAMPLES XVIII–XXIV

Telomerization of acrylamide with $C_6F_{13}I$ (Determination of the transfer constant)

Working as in Examples I–IX with $C_6F_{13}I$, in an inactinic round-bottomed flask, the following results are obtained:

TABLE III

| EXAMPLE | Ro  | % F   | $\overline{DP}\,n$ |
|---------|-----|-------|-----|
| XVIII   | 0.1 | 1.94  | 173 |
| XIX     | 0.2 | 3.38  | 96  |
| XX      | 0.3 | 5.35  | 58  |
| XXI     | 0.4 | 6.53  | 47  |
| XXII    | 0.5 | 8.42  | 35  |
| XXIII   | 0.7 | 11.04 | 25  |
| XXIV    | 0.9 | 13.17 | 20  |

The transfer constant of the $C_6F_{13}I$ at 80° C is $555 \times 10^{-4}$.

EXAMPLES XXV-XXXIV

The procedure of Examples I-IX is repeated with $C_6F_{13}I$, and the reaction is only interrupted after the complete disappearance of the acrylamide.

Table IV summarizes the results obtained in ten runs performed with mole ratios ranging from 0.1 to 4.

TABLE IV

| EXAMPLE | Ro | % F | $\overline{DP}n$ |
| --- | --- | --- | --- |
| XXV | 0.1 | 2.53 | 131 |
| XXVI | 0.2 | 2.49 | 133 |
| XXVII | 0.3 | 4.95 | 64 |
| XXVIII | 0.4 | 7.42 | 40 |
| XXIX | 0.5 | 4.37 | 73 |
| XXX | 0.7 | 9.31 | 31 |
| XXXI | 0.9 | 12.31 | 22 |
| XXXII | 1.1 | 11.50 | 24 |
| XXXIII | 2 | 13.35 | 20 |
| XXXIV | 4 | 24.52 | 8 |

EXAMPLE XXXV

A reactor containing a mixture of 50 g $C_6F_{13}I$, 30 ml isopropanol and 0.2 g azobisisobutyronitrile is heated to reflux, and a solution containing 50 g acrylamide, 200 ml isopropanol and 1.4 g azobisisobutyronitrile is added over five hours.

When the addition is complete, the mixture is maintained at reflux for a further hour and then cooled to room temperature, and the reaction medium is filtered. After the solid has been thrice washed with 20 ml of isopropanol and dried in the oven at 70° C., 60 g of a yellowish pulverulent solid are obtained, the fluorine content of which is equal to 11.3%, corresponding to a $\overline{DP}n$ of 24.5.

The surface tension of an aqueous solution containing 1000 ppm of this product is 16 mN/m at 25° C., and that of the 100 ppm solution is 26.6 mN/m.

EXAMPLE XXXVI

Using 61.2 g of $C_8F_{17}I$ under the same conditions as in Example XXXV and with the same amounts of the other reagents, 64 g of telomer containing 18.2% of fluorine is obtained, corresponding to a $\overline{DP}n$ of 17.

The surface tension of an aqueous solution containing 100 ppm of this telomer is 17.8 mN/m at 25° C.

EXAMPLE XXXVII

A reactor is charged with 140 ml of isopropanol and 264.5 g of an $R_FI$ mixture having the following composition by weight:
$C_6F_{13}I$: 50.9%
$C_8F_{17}I$: 25.7%
$C_{10}F_{21}I$: 13%
$C_{12}F_{25}I$: 6.3%
$C_{14}F_{29}I$: 2.6%
$C_{16}F_{33}I$: 0.9%
$C_{18}F_{37}I$: 0.1%
the average molecular weight being 513.

With the mixture of $R_FI$ and isopropanol heated to reflux, a solution of 230 g acrylamide, 920 ml isopropanol and 6.4 g azobisisobutyronitrile is introduced during five hours with stirring.

When the addition is complete, a further 2 g of azobisisobutyronitrile is added and heating is continued under reflux for two hours. The reaction mixture is then cooled to room temperature and filtered. After the solid has been washed twice with 150 ml of isopropanol and dried under vacuum, 304 g of yellowish pulverulent product are obtained containing 17.6% of fluorine, corresponding to a $\overline{DP}n$ of 16.5.

This product is soluble in water and in aqueous alcoholic media, and causes the surface tension of water to be lowered significantly.

The surface tension of aqueous solutions at 25° C. containing:

| 1000 ppm of fluorinated product: | 18.9 mN/m |
| --- | --- |
| 100 ppm of fluorinated product: | 21.6 mN/m |

EXAMPLE XXXVIII

Under the same conditions as in Example XXXVII with methyl ethyl ketone as the solvent, 305 g of dry telomer is obtained containing 16% of fluorine, which corresponds to a $\overline{DP}n$ of 19.

The surface tension of the aqueous solutions at 25° C.:
1000 ppm: 19.4 mN/m
100 ppm: 21.6 mN/m

EXAMPLE XXXIX

A reactor is charged with 57 g of an $R_FI$ mixture identical in composition to that used for Example XXXVII, 160 ml of isopropanol, and 0.3 g of azobisisobutyronitrile. The mixture is heated to reflux, and 5 g of solid acrylamide and 0.14 g of azobisisobutyronitrile are then added every hour during a period of nine hours so as to introduce a total of 50 g of acrylamide and 1.4 g of azobisisobutyronitrile. After the final introduction, the mixture is maintained at reflux for a further half hour; another 0.3 g of azobisisobutyronitrile is then added, and the mixture is maintained under reflux for a further hour. After the mixture has been cooled and filtered, and the solid washed twice with 30 ml of isopropanol and dried, 69 g of solid telomer is obtained with a 14.6% fluorine content, corresponding to a $\overline{DP}n$ of 21.5.

The surface tension of the aqueous solutions at 25° C.:

| 1000 ppm: | 19.7 mN/m |
| --- | --- |
| 100 ppm: | 21.1 mN/m |

EXAMPLE XL

Telomerization of methacrylic acid with $C_6F_{13}CH_2CH_2I$

Working as in Examples X-XVI with the acrylamide replaced by methacrylic acid and a mole ratio $C_6F_{13}CH_2CH_2I$/methacrylic acid of 4, a telomer is obtained containing 3.8% of fluorine, corresponding to a $\overline{DP}n$ of approximately 69.

EXAMPLE XLI

A reactor is charged with 125 g of $C_6F_{13}I$, 125 ml of isopropanol, and 1.5 g of azobisisobutyronitrile. The mixture is heated to reflux, and a mixture of 250 g of acrylamide 750 ml of isopropanol, and 7 g of azobisisobutyronitrile is added over the course of five hours. When the addition is complete, the mixture is maintained under reflux for one hour, 1.25 g of azobisisobutyronitrile is then added, and the mixture is maintained at reflux for a further two hours. Four hundred grams of water is then introduced into the reactor, and most of the isopropanol is removed by distillation to obtain 663 g of distillate containing 20 g of $C_6F_{13}H$, but containing no $C_6F_{13}I$. The degree of conversion of the $C_6F_{13}I$ is quantitative.

The distillation residue (769 g) yields, after drying in an oven at 100° C., 360 g of dry product containing 14.3% of fluorine, corresponding to a telomer having a $\overline{DP}n$ in the neighborhood of 18.

EXAMPLE XLII

A reactor is charged with 62.5 g of $C_6F_{13}I$, 48.5 g of acetonitrile and 1.1 g of azobisisobutyronitrile, and the mixture is heated to reflux.

Under stirring and reflux, a solution of 125 g of acrylamide in 292.5 g of acetonitrile is added over three and a half hours. During this time, 1.1 g of azobisisobutyronitrile is added each 70 minutes.

When the addition of acrylamide is complete, the mixture is maintained under reflux for one and a half hour, then 0.65 g of azobisisobutyronitrile is added, refluxing is continued for one further hour, and 200 g of water are then introduced into the reaction mixture which separates into two phases after cooling. The upper phase consists of acetonitrile. The lower phase (352 g) is a solution of 45.8% telomer with a fluorine content of 6.44%, corresponding to a $\overline{DP}n$ of 18.5.

EXAMPLE XLIII

A reactor is charged with 30 ml of acetone, 0.2 g of azobisisobutyronitrile, and 57.5 g of an $R_FI$ mixture having the following composition by weight:
$C_6F_{13}I$: 55.8%
$C_8F_{17}I$: 26.9%
$C_{10}F_{21}I$: 11%
$C_{12}F_{25}I$: 4%
$C_{14}F_{29}I$: 1.4%
$C_{16}F_{33}I$: 0.5%
$C_{18}F_{37}I$: 0.2%

Under stirring and reflux, a solution of 50 g of acrylamide and 1.4 g of azobisisobutyronitrile in 200 ml of acetone is added in the course of five hours.

When the addition is complete, a further 0.2 g of azobisisobutyronitrile is added and heating is continued under reflux for one hour. The reaction mixture is then cooled to room temperature and filtered. After the solid has been washed thrice with 20 ml of acetone and dried in an oven at 70° C., 66.7 g of a product containing 14.6% of fluorine is obtained, corresponding to a $\overline{DP}n$ of 21.5.

EXAMPLE XLIV

Following the procedure of Example XLIII, and replacing the acetone by ethanol, 63 g of solid containing 17.7% of fluorine is obtained, corresponding to a $\overline{DP}n$ of 16.5.

EXAMPLE XLV

A reactor is charged with 115 g of an $R_FI$ mixture identical in composition to that used for Example XLIII, 125 ml of 2-methyl-2-propanol, and 2.12 g of azobisisobutyronitrile.

Under stirring and gentle reflux, a solution of 250 g of acrylamide in 750 ml of 2-methyl-2-propanol is added in the course of three and a half hours. During this time, 2.12 g of azobisisobutyronitrile is added each 70 minutes.

When the addition of acrylamide is complete, heating under reflux is continued for one and a half hour, then a further 1.25 g of azobisisobutyronitrile is added and refluxing is maintained for one hour.

After removing 261 g of 2-methyl-2-propanol by distillation, 400 g of water is added and 350 g of water/2-methyl-2-propanol azeotrope is then distilled off, to obtain 805.5 g of a solution containing 44.6% telomers. The fouorine content of this solution is 7.55%, corresponding to a $\overline{DP}n$ of about 17 and to a 91.2% conversion rate of the $R_FI$.

Gas phase chromatographic analysis of the distillates shows only the presence of $R_FI$, which can be recycled, and the absence of $R_FH$.

USE OF THE SEQUENCE-CONTAINING OLIGOMERS AS ADDITIVES FOR PROTEIN-BASED EMULSIFIERS

The effect of the presence of small amounts of fluorinated surfactants according to this invention in protein-based emulsifiers is demonstrated by investigating the following properties of these emulsifiers:
Expansion ratio
Foaming power
Collapse time
Foam fluidity
Contamination of the foam by hydrocarbons.

Commercial protein-based emulsifiers are generally used in the form of 3% or 6% strength concentrates which are diluted at the time of use with water, either fresh water or sea water, in the proportion of three or six parts of concentrate per 100 parts of final product. All the trials are carried out with a dilute solution obtained by diluting six parts of a 6% strength protein-based concentrate with fresh water.

The effect of the presence of the fluorinated surfactants is demonstrated by incorporating a certain amount of fluorinated surfactant in a dilute proteinaceous solution of this type. In order to be able to make a valid comparison of the different fluorinated surfactants, the trials are carried out by introducing an amount of fluorinated surfactant corresponding always to the same fluorine content, namely, 40 mg of fluorine per liter of dilute solution. This 40 mg quantity of fluorine per liter corresponds, for example, to 0.02% by weight of a fluorinated surfactant containing 20% fluorine.

Different types of protein-based concentrates are used, since the properties of a given protein-based emulsifier depend at one and the same time on the type of proteins used, the method of hydrolysis, and the various ingredients optionally added.

The properties of the foam are determined on the basis of a number of simple tests which permit the influence of adding the fluorinated surfactant to be fully appreciated.

(a) Expansion ratio and settling time

One hundred milliliters of dilute solution are converted to foam using a household mixer (Moulinex type 116.2.02) equipped with two whisks. The 100 ml of foaming solution is placed in the bowl and the beater is operated for 2 minutes 15 seconds. After this time, the liquid is usually completely converted to foam, and this foam is poured as quickly as possible into a graduated conical-base cylinder which enables its volume and settling time to be measured. The expansion ratio (ER) isdefined by the ratio:

$$ER = V/v$$

where V is the volume of foam obtained, and v the volume of aqueous solution effectively converted to foam, that is, 100 ml if all the liquid has indeed been converted completely to foam.

The settling time (ST) is the time required to collect in the graduated cylinder a volume of liquid corresponding to one quarter of the volume of foaming solution converted to foam, in principle 25 ml.

(b) Foaming power (FP)

The foaming power is the volume of foam obtained by pouring with the use of a funnel 500 ml of foaming solution into 100 ml of the same foaming solution placed in the bottom of a graduated 2-liter cylinder. The diameter of the funnel is 160 mm and the base of the funnel (internal diameter: 13 mm) is 450 mm above the surface of the 100 ml of solution. The volume of foam is measured 30 seconds after the introduction of the 500 ml of foaming solution into the cylinder.

(c) Foam fluidity

The foam fluidity is determined by the speed of flow (SF) of the foam on an inclined plane. For this, a PVC (polyvinyl chloride) box is used, having holes in its base and which is inclined 10° from the horizontal. This box, the dimensions of which are:

height: 10 cm
width: 21 cm
length: 35 cm contains a compartment ($10 \times 21 \times 10.5$ cm) which permits two liters of foam to be received and which is separated from the remainder of the box by a movable shutter. The compartment is filled with two liters of foam obtained using the beater described in section (a) concerning the expansion and settling of the foam, and this foam is then released by raising the movable shutter. The time required for the foam completely to cover the inclined plane, that is, the base of the box, is then noted. The shorter this time is, the more mobile the foam. When the foam has not covered the whole inclined plane after 60 seconds, the percentage of the surface of the inclined plane covered with foam is recorded for this time.

(d) Contamination of the foam by hydrocarbons

The foaming power of some protein-based emulsifiers is severely affected by the presence of hydrocarbons. This tolerance towards hydrocarbons can be characterized by measuring the foam formed in the presence of hydrocarbons, with the following test:

A mixture of 50 ml of cyclohexane and 50 ml of the foaming solution to be tested is stirred for one hour with a rotary stirrer, this mixture being in a glass bottle of one liter capacity. After the stirring is stopped, the foam height (FH) formed in the bottle is measured. The greater this foam height is, the better the tolerance of the foam to contamination by hydrocarbons.

Table V below summarizes the results obtained in the tests described above, starting with the same sodium-containing protein-based concentrate diluted to the amount used with fresh water, an amount of fluorinated surfactant corresponding to 40 mg of fluorine per liter of dilute solution then being added. For the purposes of comparison, a control trial (without surfactants) and trials using commercial fluorinated surfactants not according to the present invention, namely:

Forafac 1110: nonionic fluorinated surfactant;
Forafac 1119: potassium salt of a carboxylic acid having a perfluorinated chain;
Forafac 1157: amphoteric fluorinated surfactant were carried out.

Consideration of the results leads to the observation that Forafac 1110 acts as an antifoam. The other two commercial products (Forafac 1119 and Forafac 1157) show better behavior. Their speed of flow (SF) is excellent, but at the expense of foaming power. Furthermore, the tolerance to hydrocarbons (FH) is not good in any of these cases.

All the products according to this invention lead to significant improvements in the performances of the foams, especially the settling time, the speed of flow, and the tolerance to contamination by hydrocarbons.

TABLE V

| FLUORINATED SURFACTANT | PROPERTIES | | | | |
|---|---|---|---|---|---|
| | ER | ST (seconds) | FP (ml) | SF (seconds) | FH (cm) |
| None (control) | 7.5 | 190 | 380 | (35% in 60 sec) | 1.5 |
| Commercial products: | | | | | |
| Forafac 1110 | 0.5 | — | 85 | — | 1.5 |
| Forafac 1119 | 7 | 170 | 340 | 14 | 1 |
| Forafac 1157 | 9 | 300 | 300 | 11 | 3 |
| Telomer according to Example | | | | | |
| XVII | 8.5 | 210 | 380 | 6 | 5 |
| XXXV | 9 | 295 | 390 | 6 | 4 |
| XXXVI | 9 | 245 | 400 | 5 | 6 |
| XXXVII | 9 | 300 | 600 | 8 | 4.5 |
| XXXVIII | 8.5 | 300 | 360 | 4 | 6.5 |
| XXXIX | 8.5 | 330 | 300 | 9 | 5 |

In order to establish that the products according to this invention enable improvement to be achieved with protein hydrolysates of different origins, the telomer of Example XXXVII is tested with two other protein-based emulsifiers. Emulsifier I is a calcium-containing protein hydrolysate and Emulsifier II is a sodium-containing hydrolysate like that used in the preceding tests, but with different properties. The results shown in Table VI permit the conclusion that the two emulsifiers are clearly improved by the addition of a surfactant of the double-sequence telomer type according to this invention.

TABLE VI

| Fluorinated surfactant | PROTEIN | | | |
|---|---|---|---|---|
| | I | | II | |
| | None | Ex. XXXVII | None | Ex. XXXVII |
| Properties: | | | | |
| ER | 7.5 | 8.5 | 7.5 | 9 |
| ST (seconds) | 225 | 385 | 130 | 230 |
| FP (ml) | 440 | 500 | 200 | 300 |
| SF (seconds) | 20% in 60 sec | 25 | 4 | 4 |
| FH (cm) | 1 | 4 | 0.5 | 2 |

What is claimed is:
1. Fluorinated telomers having the general formula:

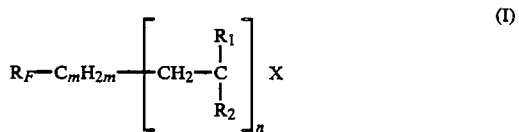

wherein $R_F$ is a poly- or perfluorinated radical; X is iodine, chlorine or bromine; m is 0, 1 or 2; n is from 5 to 1000; $R_1$ is hydrogen or methyl; and $R_2$ is a —COOH or —CONR$_3$R$_4$ group, R$_3$ and R$_4$, which can be the same or different, each being hydrogen or an alkyl or hydroxyalkyl group.

2. A fluorinated telomer according to claim 1 wherein $R_F$ is a straight or branched perfluorinated chain $C_xF_{2x+1}$, x being from 1 to 20.

3. A fluorinated telomer according to claim 2 wherein x is from 4 to 16.

4. A telomer according to claim 1 wherein X is iodine.

5. A fluorinated telomer according to claim 1 wherein $R_1$ is hydrogen and $R_2$ is a $-CONH_2$ group.

6. A fluorinated telomer according to claim 1 wherein m is 2.

7. A fluorinated telomer according to claim 1 wherein m is zero.

8. A process for preparing fluorinated telomers according to claim 1, which process comprises reacting an ethylenic monomer having the formula:

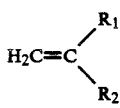 (II)

in a free-radical reaction with a telogen having the formula:

 (III)

wherein $R_1$ is hydrogen or methyl; $R_2$ is a $-COOH$ or $-CONR_3R_4$ group; $R_F$ is a poly- or perfluorinated radical; m is 0, 1 or 2; and X is iodine, chlorine or bromine.

9. A process according to claim 8 wherein the reaction is carried out in an inert solvent at a temperature from 30° to 100° C.

10. A process according to claim 8 wherein $R_F$ is a perfluorinated radical $C_xF_{2x+1}$.

11. A process according to claim 8 wherein X is iodine.

12. A process according to claim 8 wherein the ethylenic monomer is acrylamide.

13. A process according to claim 8 wherein m is 2.

14. A process according to claim 8 wherein m is zero.

15. A surfactant composition comprising at least one fluorinated telomer according to claim 1 in an aqueous medium.

16. A composition according to claim 15 additionally containing a protein-based fire-fighting emulsifier.

17. A method for extinguishing fires which comprises preparing an aqueous medium containing at least one fluorinated telomer according to claim 1 and a protein-based fire-fighting emulsifier and applying the medium to the fire.

18. A method according to claim 17 which further comprises producing a foam from the prepared aqueous medium and applying the foam to the fire.

* * * * *